United States Patent [19]

Graus et al.

[11] Patent Number: 4,900,441
[45] Date of Patent: Feb. 13, 1990

[54] SMALL FILTER AND METHOD OF ITS MANUFACTURE

[75] Inventors: Andreas Graus, Nörten-Hardenberg; Michael Schützler, Göttingen, both of Fed. Rep. of Germany

[73] Assignee: Sartorius GmbH, Göttingen, Fed. Rep. of Germany

[21] Appl. No.: 306,619

[22] Filed: Feb. 6, 1989

[30] Foreign Application Priority Data

Feb. 12, 1988 [DE] Fed. Rep. of Germany ....... 3804344

[51] Int. Cl.$^4$ .............................................. B01D 13/00
[52] U.S. Cl. ................................ 210/321.84; 210/446; 264/257
[58] Field of Search ............... 604/329; 264/257, 273; 210/445, 446, 321.84

[56] References Cited

U.S. PATENT DOCUMENTS 4,161,504  7/1979  Baldini .......................... 264/257 X
4,784,654  11/1988  Beecher .............................. 604/329

Primary Examiner—Frank Spear
Attorney, Agent, or Firm—Eric P. Schellin

[57] ABSTRACT

In a small filter with a one-piece plastic housing (1) manufactured with injection-molding technology in which a filter membrane (6) is located which is connected on its edge in a leakproof manner to the housing (1), the filter membrane (6) is covered at least on one side on the edge area (6") to be sealed by the injection molding which hardens in the injection molding form and is anchored in this injection molding.

6 Claims, 4 Drawing Sheets

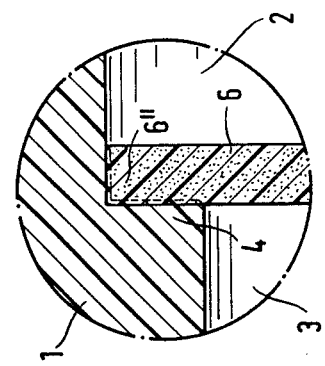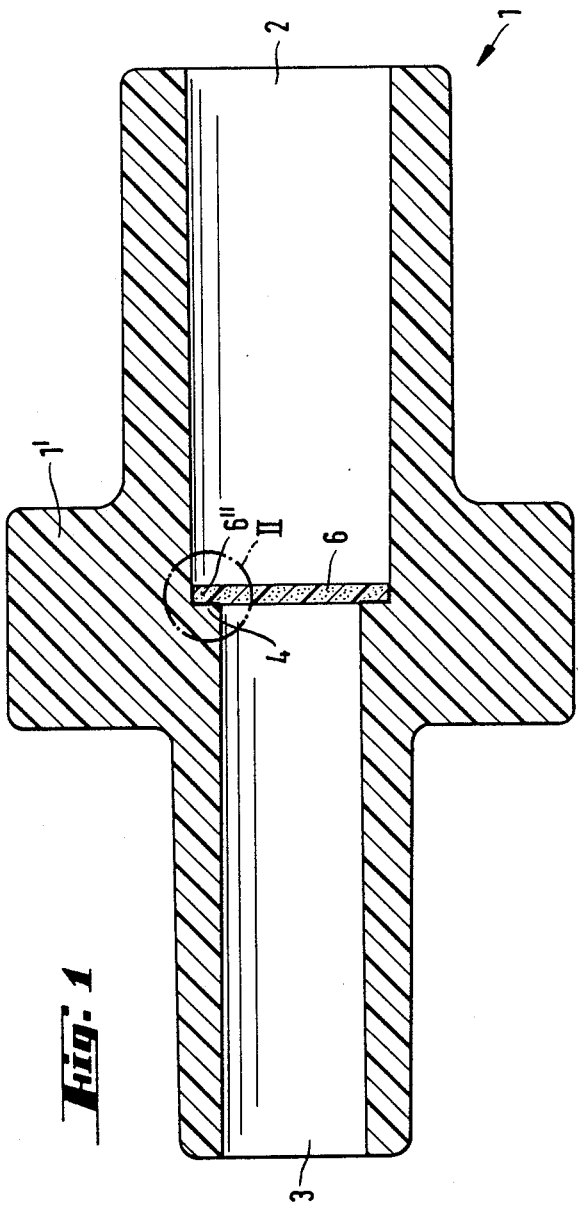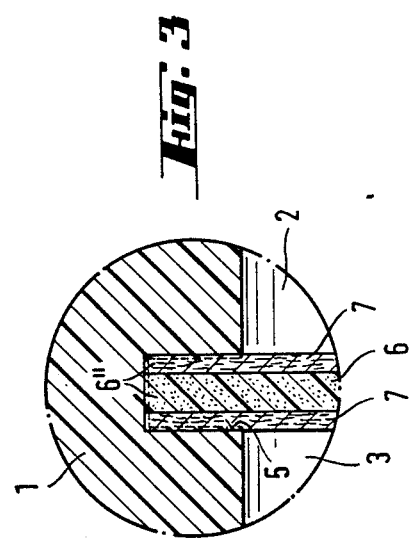

SMALL FILTER AND METHOD OF ITS MANUFACTURE

BACKGROUND OF THE INVENTION

This invention relates to a small filter consisting of plastic with a housing manufactured by injection molding in which a filter membrane connected in a leakproof manner in its edge area to the housing is positioned between an inlet and an outlet and also relates to a method of manufacturing such a small filter consisting of plastic. Such small filters in accordance with the state of the art are used especially as front attachments for injectors for the sterile filtration of very small amounts. In such instances the total length of the filter housing between the inlet end and the outlet end is approximately 20 mm and the filter diameter approximately 3–5 mm. The filter membrane is connected thereby on an inner shoulder of the filter housing by ultrasonic welding, sealing or adhesion. The manufacture of these filters needs to be improved since several work steps are necessary until the final completion of the filter using the very small individual parts. The subsequent positioning of the stamped-out filter membranes in the finished filter housings and their leakproof connection is very difficult and the part rejects rates are correspondingly high. The finished filter must generally be subjected to sterilization prior to use.

It is known from U.S. Pat. No. 4,113,627 that the filter membrane can be connected in a multipartite filter housing in several work steps by means of liquid plastic to the finished injection-molded part of plastic by injection and is also known that the filter membrane can be positioned between two finished housing parts of plastic and that all three parts (housing parts and filter membrane) can be extrusion-coated in common in a form tool on the edges with liquid plastic; however, this manufacture is very complicated on account of the many individual parts and manufacturing steps.

The inventor therefore has the problem of simplifying the manufacture of such small filters, especially the connection of the filter membrane to the housing and of improving the leakproof connection between filter membrane and housing thereby.

SUMMARY OF THE INVENTION

The invention solves this problem as follows: The housing is designed in one piece and the filter membrane is covered at least on one side on the edge area to be sealed off by the injection molding of a one-piece filter housing solidified in the injection-molding form and is anchored in the latter.

The method of manufacture is performed in accordance with the invention in that the filter membrane is supported on both sides between two oppositely movable form elements of a form tool in a form nest in such a manner that the edge area of the filter membrane to be sealed is exposed on at least one side and covered by the liquid plastic added during the injection molding, is anchored in this plastic and the solidified, one-piece housing with the integrated filter membrane is removed from the mold. The small-format filter membrane is preferably added in such a manner that it is stamped out directly from a filter band by means of a form part designed as stamping tool and this stamped part is positioned directly in the form tool and then extrusion-coated.

In this manner, the sensitive filter membrane is stamped out of a filter band, positioned in the form nest and extrusion-coated on the edge in a leakproof manner with a housing in one machine manufacturing step.

BRIEF DESCRIPTION OF THE INVENTION

The concept of the invention will now be explained in more detail in an example of an embodiment with reference made to the attached drawings.

FIG. 1 shows a typical small filter in longitudinal section.

FIG. 2 shows a detailed point of the filter membrane anchored in the plastic of the one-part filter housing.

FIG. 3 shows a variant of this anchoring.

Figure 4:
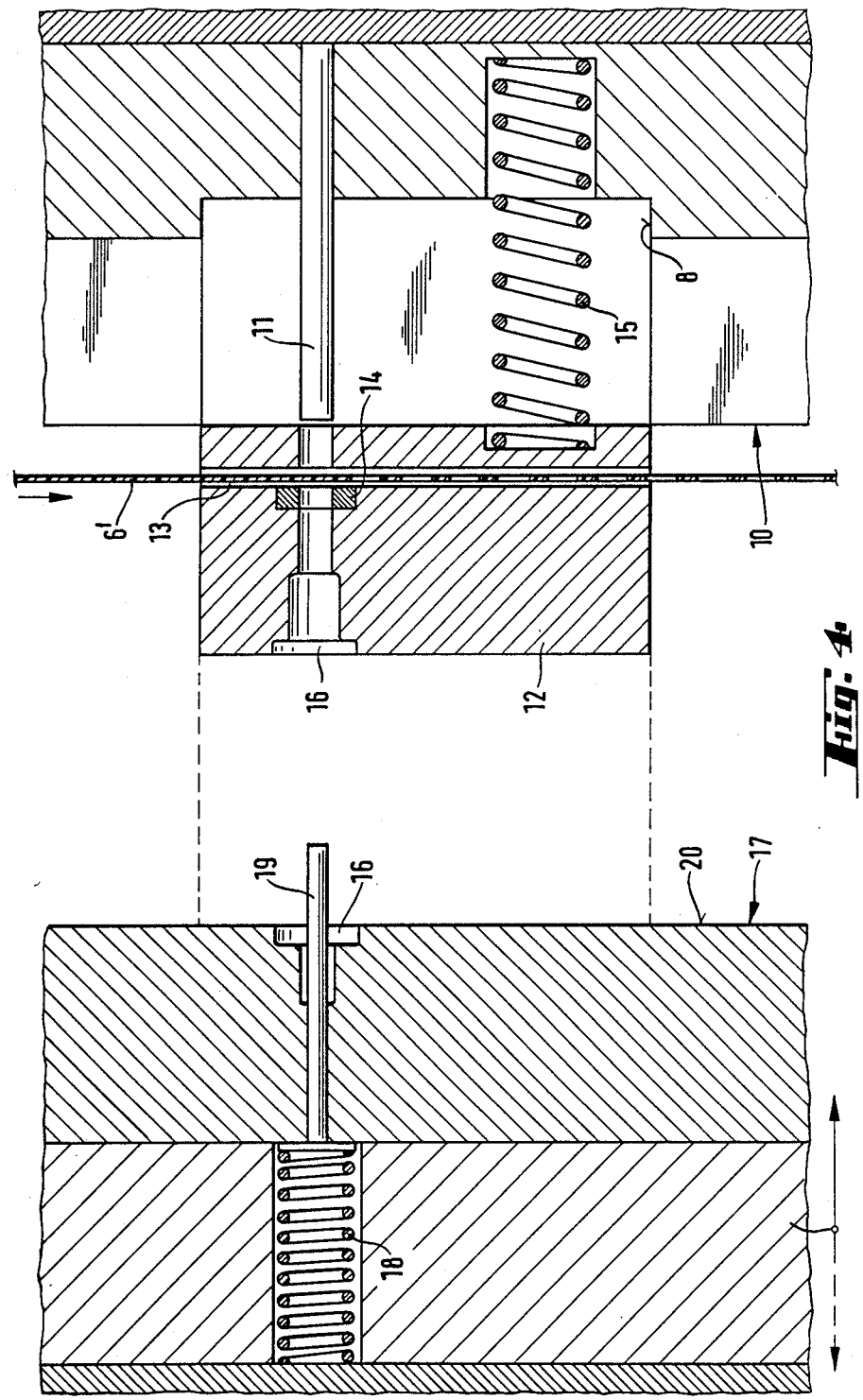

FIG. 4 schematically shows a vertical section through the form tool in open position.

Figure 5:
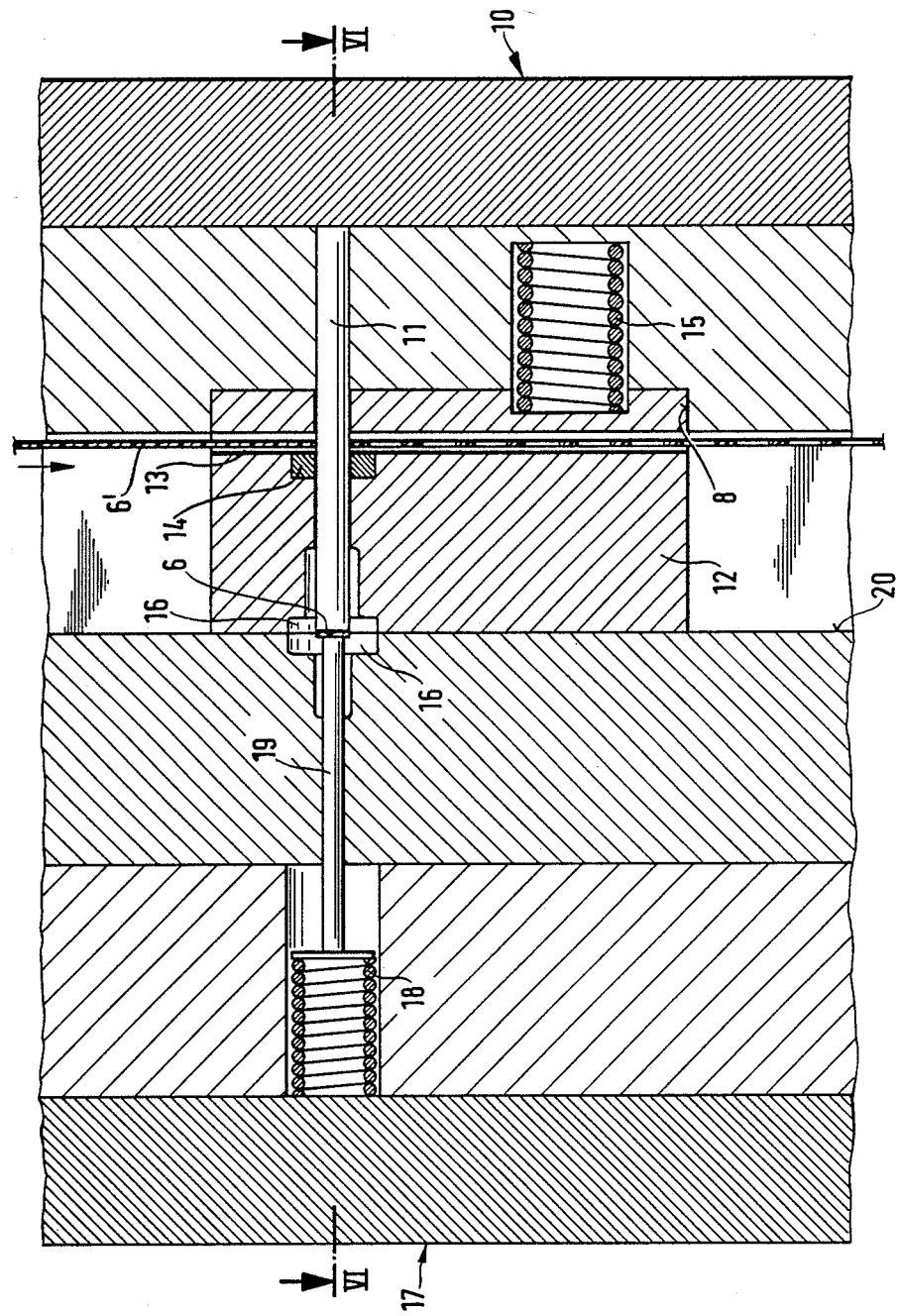

FIG. 5 shows a vertical section through the form tool in closed position.

Figure 6:
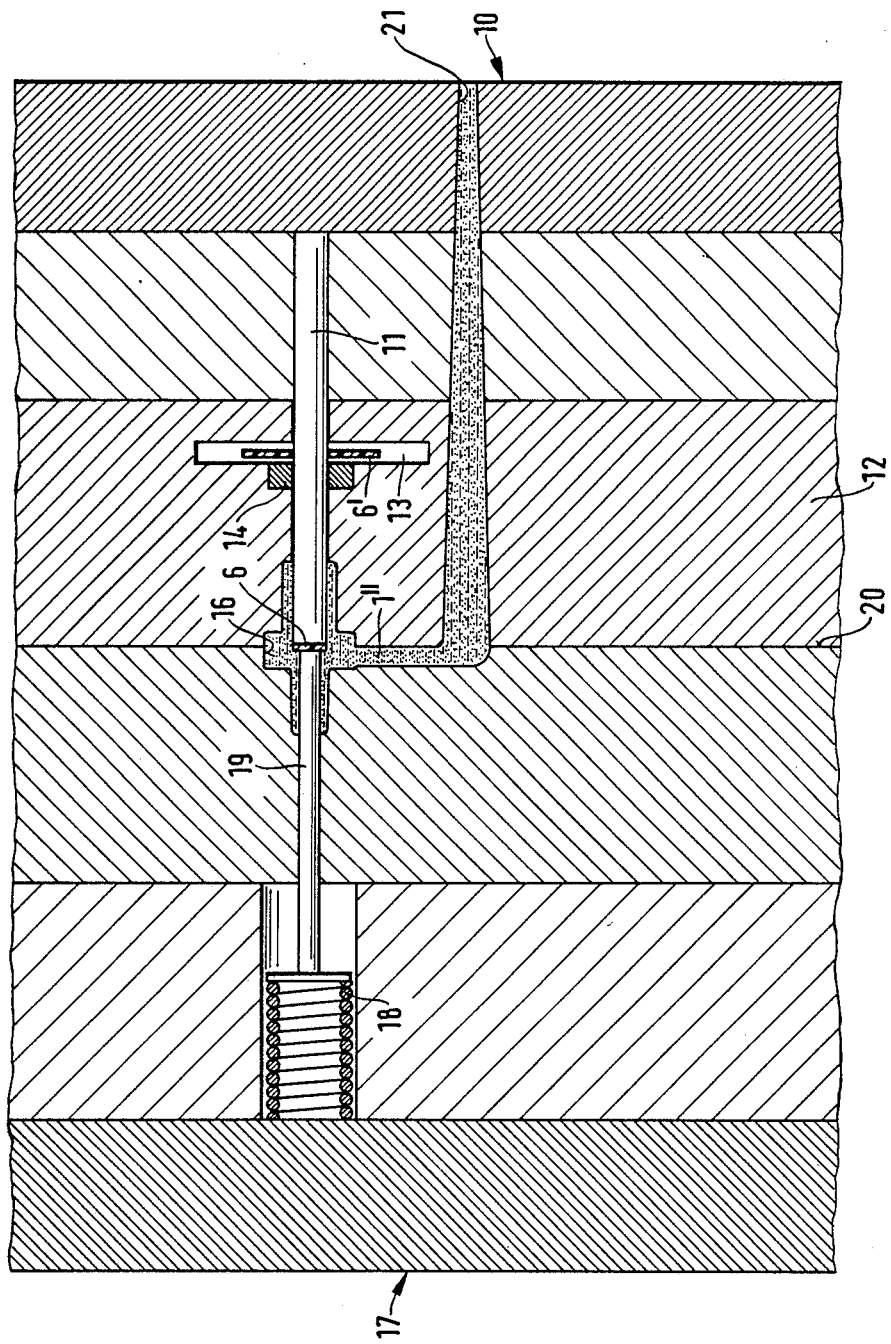

FIG. 6 shows a horizontal section through the form tool in the position of FIG. 5.

DETAILED DESCRIPTION OF THE INVENTION

The small filter consists of a one-part plastic housing 1 with inlet 2, outlet 3 and membrane filter 6 anchored on an inner shoulder 4 in edge are 6" in the plastic of housing 1. The anchoring takes place by means of the liquid housing plastic injected into the form tool, which plastic starts to dissolve exposed edge area 6" of membrane filter 6, depending on the filter material, and is united with the latter or penetrates at least superficially into the pore structure and is anchored in or on the latter.

In the detailed embodiment according to FIG. 3, the inner shoulder 4 has been widened to a circumferential annular groove 5 so that edge area 6" of filter membrane 6 is enclosed in a U-shaped manner. In the embodiment of FIG. 1, inlet 2 and outlet 3 have been adapted in size approximately to the active filter area.

Thin and sensitive membrane filters can be mechanically supported in the case of rather large filter areas by means of drainage screen layer 7 in the form of a fleece or fabric which is areally located on one side or on both sides or is integrated. The edge area of drainage layer 7 is likewise anchored in the plastic of one-part filter housing 1.

Instead of housing 1 shown in FIG. 1, the housing can also be made very flat and exhibit the form of an annulus 1', in the opening of which filter membrane 6 is anchored in the plastic, and be positioned for its part in a surrounding housing.

The manufacturing form tool consists of stationary tool half 10 and of movable tool half 17. Stationary tool half 10 comprises stationary core 11 which functions at the same time as a punching stamp. Movable tool insert 12 cooperates with this stationary core 11 which insert comprises slot-shaped membrane guide 13, a cutting plate 14 or cutting sleeve which cooperates with punching stamp 11 and comprises the one half of form nest 16. Movable tool insert 12 is guided in recess 8 of tool half 10 and is biased by return spring 15 in the recess.

Movable tool half 17 comprises the other half of form nest 16 and comprises movable plug 19 for membrane fixing which is biased on return spring 18.

According to FIG. 6 sprue 20 for the infeed of liquid plastic 1" is located in form parting plane 20 and in stationary tool half 10. The sprue can also be optionally located as heating conduit entirely in the one half of the form tool.

According to FIG. 4, membrane filter band 6' is passed stepwise through slot-shaped membrane guide 13. During the coaxial motion of movable tool insert 12 and of movable tool half 17 into the closed position according to FIG. 5, a membrane filter 6 is punched out of filter band 6' by perforation stamp 11 and cutting sleeve 14, positioned by perforation stamp 11 and plug 19 in form nest 16 and subsequently anchored on the edge by liquid plastic mass 1" injected through sprue 21 according to FIG. 6. After plastic mass 1" has hardened, the finished small filter in accordance with FIG. 1 is removed from the form and membrane band 6' is guided further in membrane guide 13.

A filter band consisting of membrane filter 6 reinforced on one or both sides by screen layer 7 is processed in the same manner.

The manufacture is quite expedient and the anchoring of membrane filter 6 in the plastic mass of one-part housing 1 is leakproof and reliable. If the manufacture is carried out under clean-room conditions, the small filters leave form nest 16 practically free of particles. Since liquid injection-molding mass 1" consisting e.g. of polypropylene exhibits an approximate temperature of 230° C. in form nest 16 and the temperature of injection-molding mass 1" briefly irradiates presterilized filter membrane 6 accordingly, especially in the case of small form nests 16 and quite small form stamps 11,19 and filter membrane 6 positioned thereon, this type of manufacture for one-piece plastic housing 1 takes place under sterile conditions and is, as regards filter membrane 6, at least germ-reducing and under certain conditions even sterilizing, which is advantageous for all areas of application of the filters. This can, if applicable, eliminate a further treatment of the small filters.

What is claimed is:

1. A small one-piece sterile, leakproof filter consisting of a membrane filter with housing manufactured by injection molding, said filter membrane being located between an inlet and an outlet of said housing, and connected to the housing in its edge area in a sterile and leakproof manner, characterized in that housing (1) is one-piece and the filter membrane (6) is covered on at least one side on the edge area (6") by a liquid plastic seal added during injection molding at about 230° C. and which has hardened after injection molding to anchor said membrane in said hardened plastic.

2. The filter according to claim 1, wherein housing (1) forms a flat, annular injection-molded part and the edge of the filter membrane (6) is anchored on both sides in the plastic of the injection-molded part.

3. The filter according to claims i or 2, wherein membrane (6) is reinforced on one or both sides by a screen layer (7) which is likewise anchored in said plastic.

4. A method of manufacturing small sterile, leakproof one-piece filters consisting of a membrane with a housing (1) made by injection molding in which a membrane filter (6) is connected on the edge in a leakproof manner to plastic housing (1) and is located between an inlet (2) and an outlet (3), comprising supporting both sides of filter membrane (6) between two oppositely movable form elements (11, 19) of a form tool (10, 17) in a form nest (16) injecting liquid plastic at about 230° C. through a sprue in such a manner that the edge area (6") of the filter membrane (6) is exposed on a least one side and covered by the liquid plastic (1") added during injection molding to form a seal, which anchors said membrane in this plastic and solidified, one-piece housing, before removing said housing from the mold.

5. The method of claim 4, wherein filter membrane (6) brought into the form tool (10, 17) is guided as a band (6') between a punching tool (11, 14) and introduced as a punching part directly into the form tool (10, 17) and positioned there.

6. The method of claim 4, wherein the filter membrane (6) brought into the form tool (10, 17) is guided as a band (6') in a part (12) of the form tool (10, 17) which part is designed as a punching tool, the filter membrane is punched out of the band (6') and introduced by movable part (12) of the punching tool into form nest (16) and is fixed in the latter in the form tool to a counterholder (19) for filter membrane (6) until removal from the form.

* * * * *